US012705480B2

(12) United States Patent
Lee et al.

(10) Patent No.: US 12,705,480 B2
(45) Date of Patent: Aug. 11, 2026

(54) DEVICE AND METHOD USING MACHINE LEARNING MODEL SHARED BY PLURALITY OF APPLICATIONS

(71) Applicant: SAMSUNG ELECTRONICS CO., LTD., Suwon-si (KR)

(72) Inventors: Hyeonsu Lee, Suwon-si (KR); Mooyoung Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 794 days.

(21) Appl. No.: 17/864,697

(22) Filed: Jul. 14, 2022

(65) Prior Publication Data

US 2022/0351041 A1 Nov. 3, 2022

Related U.S. Application Data

(63) Continuation of application No. PCT/KR2021/003336, filed on Mar. 18, 2021.

(30) Foreign Application Priority Data

Feb. 23, 2021 (KR) ........................ 10-2021-0023894

(51) Int. Cl.

*G06F 16/00* (2019.01)
*G06F 9/54* (2006.01)
*G06N 3/08* (2023.01)

(52) U.S. Cl.

CPC ............... *G06N 3/08* (2013.01); *G06F 9/542* (2013.01)

(58) Field of Classification Search

CPC ............ G06N 3/08; G06N 3/04; G06N 3/063; G06N 20/20; G06N 5/04; G06F 9/542; G06F 2209/5015; G06F 2209/509; G06F 2209/542; G06F 9/4843; G06F 9/5055; G06F 9/545; G06F 9/5044

See application file for complete search history.

(56) References Cited

U.S. PATENT DOCUMENTS 10,204,154 B2 2/2019 Barday et al.
10,606,297 B2 3/2020 Al-Mohssen et al.
10,733,311 B2 * 8/2020 Chen .................. G06F 21/6218
12,315,502 B1 * 5/2025 Aiken ..................... G10L 15/30

(Continued)

FOREIGN PATENT DOCUMENTS

EP 3 309 719 4/2018
KR 10-1512814 4/2015

(Continued)

OTHER PUBLICATIONS

Extended Search Report dated Aug. 22, 2023 in corresponding European Application No. 21928166.4.

(Continued)

*Primary Examiner* — Noosha Arjomandi
(74) *Attorney, Agent, or Firm* — Nixon & Vanderhye P.C.

(57) ABSTRACT

An electronic device may map a target application to a machine learning model matched to a request of the target application among a plurality of machine learning models, may generate an inference result for sensing data corresponding to the machine learning model based on the sensing data being sensed by the at least one sensor, and may transfer the generated inference result to at least one of the target application and another application.

18 Claims, 9 Drawing Sheets

(56) References Cited

U.S. PATENT DOCUMENTS

2002/0174073 A1* 11/2002 Nordman ............. G06Q 20/382 705/64
2012/0023586 A1* 1/2012 Flickner ................ G06F 16/245 726/25
2012/0035881 A1 2/2012 Rubin et al.
2013/0018954 A1* 1/2013 Cheng ................... G06F 16/436 709/204
2013/0159223 A1* 6/2013 Bahl ........................ G06N 5/04 706/46
2013/0340086 A1* 12/2013 Blom .................. G06F 21/6245 726/26
2014/0196158 A1* 7/2014 Buck ....................... G06F 21/31 726/30
2017/0220817 A1* 8/2017 Shen ................... G06F 21/6254
2018/0188760 A1 7/2018 Al-Mohssen et al.
2018/0336264 A1 11/2018 Barday et al.
2019/0050746 A1 2/2019 Sanketi et al.
2019/0130300 A1 5/2019 Perone et al.
2019/0163544 A1* 5/2019 Ekambaram ........ H04L 63/1425
2020/0004596 A1 1/2020 Sengupta et al.
2020/0045163 A1 2/2020 Hwang et al.
2020/0278738 A1* 9/2020 Madar, III ............... G06N 5/04
2021/0004911 A1* 1/2021 Poss ....................... G01D 21/02
2021/0065063 A1* 3/2021 Gazzetti ................. G06N 20/20
2022/0335945 A1* 10/2022 Madar, III ............ H04W 12/60
2022/0351041 A1* 11/2022 Lee ....................... G06F 9/5044
2022/0358375 A1* 11/2022 Finnie ...................... G06N 5/04
2023/0113408 A1* 4/2023 Rajasekar ............. G06F 18/285 706/12
2024/0120982 A1* 4/2024 Jha ........................ G01S 5/0295
2024/0349227 A1* 10/2024 Yang ..................... H04W 64/00
2025/0165716 A1* 5/2025 Cristache ................ G06F 40/30

FOREIGN PATENT DOCUMENTS

KR 10-2020-0002034 1/2020
KR 10-2020-0054352 5/2020
KR 10-2020-0087259 7/2020
KR 10-2020-0142374 12/2020

OTHER PUBLICATIONS

India Hearing Notice dated Mar. 17, 2026 for IN Application No. 202317038234.

Korean Office Action dated Jan. 25, 2026 for KR Application No. 10-2021-0023894.

* cited by examiner

DEVICE AND METHOD USING MACHINE LEARNING MODEL SHARED BY PLURALITY OF APPLICATIONS

CROSS-REFERENCE TO RELATED APPLICATIONS

This application claims is a continuation of International Application No. PCT/KR2021/003336 designating the United States, filed on Mar. 18, 2021, in the Korean Intellectual Property Receiving Office and claiming priority to Korean Patent Application No. 10-2021-0023894, filed on Feb. 23, 2021, in the Korean Intellectual Property Office, the disclosures of which are incorporated by reference herein in their entireties.

BACKGROUND

1. Field

The disclosure relates to technology of using a machine learning model shared by a plurality of applications.

2. Description of Related Art

Research is being conducted on trying to apply an efficient pattern recognition method of humans to an actual computer. The research includes research on an artificial neural network (ANN) obtained by modeling characteristics of human biological neurons by mathematical expressions. To address an issue of classifying an input pattern as a predetermined group, the ANN employs an algorithm based on learning abilities of humans. Through the algorithm, the ANN may generate mapping between input patterns and output patterns, and has a generalization capability of generating a relatively correct output with respect to an input pattern that was not used for training.

SUMMARY

According to an example embodiment, an electronic device includes: a processor; a memory electrically connected to the processor and configured to store a plurality of machine learning models; and at least one sensor configured to sense sensing data, wherein the processor is configured to: map a target application to a machine learning model matched to a request of the target application among the plurality of machine learning models; in response to sensing data corresponding to the machine learning model being sensed by the at least one sensor, generate an inference result by applying the mapped machine learning model to the sensing data; and transfer the generated inference result to at least one of the target application and another application mapped to the machine learning model.

The processor may be further configured to provide the generated inference result to the target application configured to operate in one of a foreground process and a background process and the other application configured to operate in one of the foreground process and the background process.

The processor may be further configured to: based on an application mapped to the machine learning model being deactivated, generate the inference result using the machine learning model before a corresponding application is activated; and activate the corresponding application based on the inference result.

The processor may be further configured to activate the deactivated application based on at least one of an estimated label and an output value included in the inference result.

The processor may be further configured to: in response to an output value included in the inference result being out of a threshold range, activate the deactivated application and transfer the inference result to the target application; and in response to the output value included in the inference result being within the threshold range, maintain a state of the deactivated application.

The processor may be further configured to, in response to an estimated label included in the inference result being matched to a reference label registered in the deactivated application, activate the deactivated application.

The processor may be further configured to, every time another inference result is generated based on the corresponding application being activated, provide the other inference result to the corresponding application.

The processor may be further configured to determine the machine learning model matched to the target application, based on at least one or a combination of two or more of a type of input data required in an inference operation of the target application, a format of the input data, an input source, a type of output data, a label list of the output data, and a format of the output data, among the plurality of machine learning models.

The processor may be further configured to generate the inference result by implementing the machine learning model on the sensing data, using an accelerator. The accelerator may include a at least one or a combination of two or more of a central processing unit (CPU), a graphics processing unit (GPU), a digital signal processor (DSP), and a neural processing unit (NPU).

The plurality of machine learning models may be stored in a memory space different from a memory space in which the target application is stored.

According to an example embodiment, a method implemented by a processor includes: mapping a target application to a machine learning model matched to a request of the target application among a plurality of machine learning models; in response to sensing data corresponding to the machine learning model being sensed by at least one sensor, generating an inference result by applying the mapped machine learning model to the sensing data; and transferring the generated inference result to at least one of the target application and another application mapped to the machine learning model.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
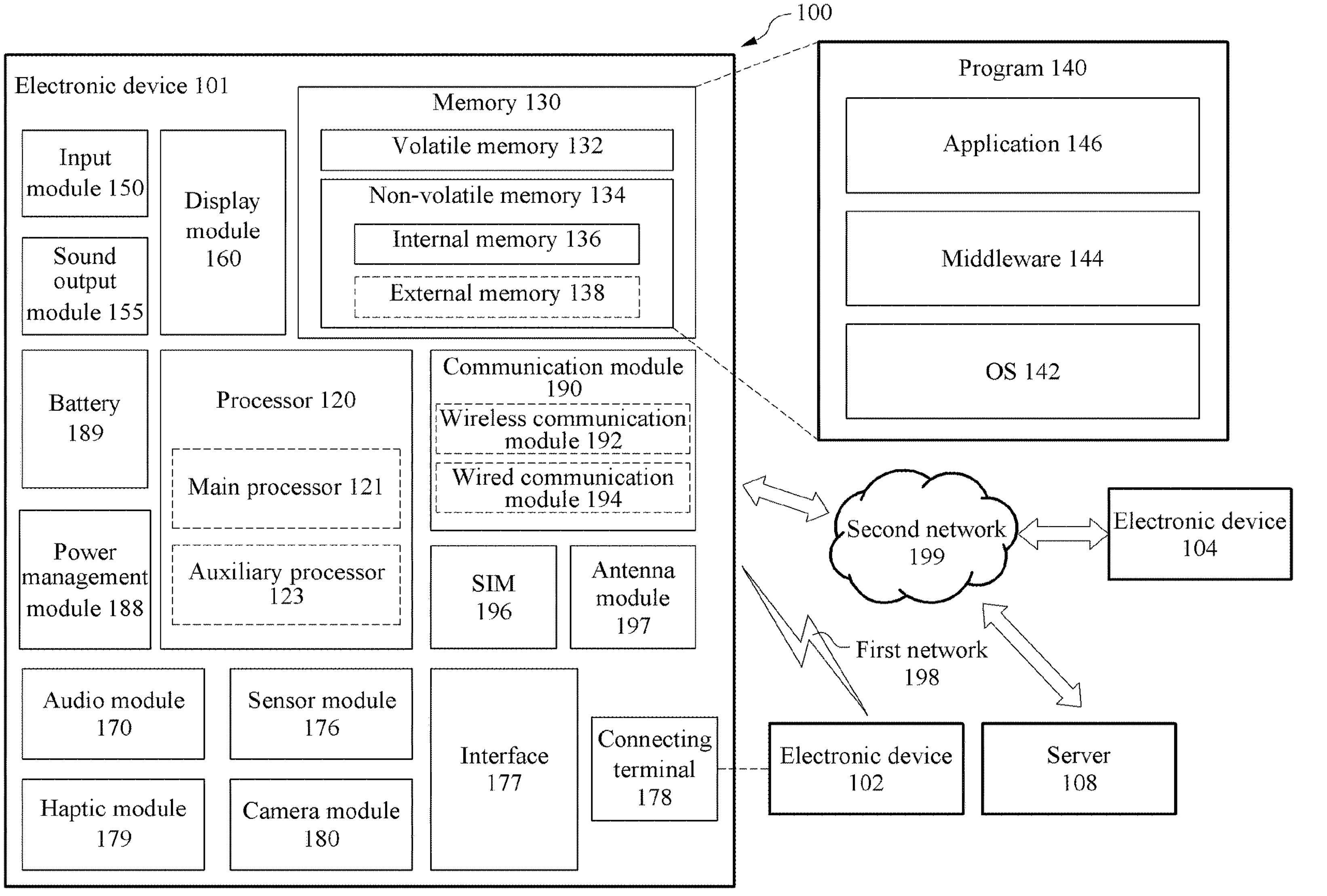
FIG. 1 is a block diagram illustrating an example electronic device in a network environment according to various embodiments.

Hereinafter, various example embodiments will be described in greater detail with reference to the accompanying drawings. When describing the example embodiments with reference to the accompanying drawings, like reference numerals refer to like elements and a repeated description related thereto may not be provided.

FIG. 1 is a block diagram illustrating an example electronic device 101 in a network environment 100 according to various example embodiments. Referring to FIG. 1, the electronic device 101 in the network environment 100 may communicate with an electronic device 102 via a first network 198 (e.g., a short-range wireless communication network), or communicate with at least one of an electronic device 104 or a server 108 via a second network 199 (e.g., a long-range wireless communication network). According to an example embodiment, the electronic device 101 may communicate with the electronic device 104 via the server 108. According to an example embodiment, the electronic device 101 may include a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, or an antenna module 197. In various example embodiments, at least one of the components (e.g., the connecting terminal 178) may be omitted from the electronic device 101, or one or more other components may be added in the electronic device 101. In various example embodiments, some of the components (e.g., the sensor module 176, the camera module 180, or the antenna module 197) may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to an example embodiment, as at least a part of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an example embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to an example embodiment, the auxiliary processor 123 (e.g., an ISP or a CP) may be implemented as a portion of another component (e.g., the camera module 180 or the communication module 190) that is functionally related to the auxiliary processor 123. According to an example embodiment, the auxiliary processor 123 (e.g., an NPU) may include a hardware structure specified for processing of a machine learning model. The machine learning model may be generated through machine learning, and may also be referred to as an artificial intelligence model. Such learning may be performed by, for example, the electronic device 101 in which artificial intelligence is performed, or performed via a separate server (e.g., the server 108). Learning algorithms may include, but are not limited to, for example, supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The AI model may additionally or alternatively include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing record. The receiver may be used to receive an incoming call. According to an example embodiment, the receiver may be implemented separately from the speaker or as a part of the speaker.

The display module 160 may visually provide information to the outside (e.g., a user) of the electronic device 101.

The display module 160 may include, for example, a control circuit for controlling a display, a hologram device, or a projector and control circuitry to control a corresponding one of the display, the hologram device, and the projector. According to an example embodiment, the display module 160 may include a touch sensor adapted to detect a touch, or a pressure sensor adapted to measure the intensity of force incurred by the touch.

The audio module 170 may convert a sound into an electric signal or vice versa. According to an example embodiment, the audio module 170 may obtain the sound via the input module 150 or output the sound via the sound output module 155 or an external electronic device (e.g., the electronic device 102 such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101, and generate an electric signal or data value corresponding to the detected state. According to an example embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an example embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to an example embodiment, the connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via his or her tactile sensation or kinesthetic sensation. According to an example embodiment, the haptic module 179 may include, for example, a motor, a piezoelectric element, or an electric stimulator.

The camera module 180 may capture still images and moving images. According to an example embodiment, the camera module 180 may include one or more lenses, image sensors, image signal processors, or flashes.

The power management module 188 may manage power supplied to the electronic device 101. According to an example embodiment, the power management module 188 may be implemented as, for example, at least a part of a power management integrated circuit (PMIC). The power management module 188 may include a power gauge, and the power gauge may measure use state information about the battery 189 (e.g., a capacity, a number of times of charging or discharging, a voltage, or a temperature of the battery 189).

The battery 189 may supply power to at least one component of the electronic device 101. According to an example embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently of the processor 120 (e.g., an AP) and that support a direct (e.g., wired) communication or a wireless communication. According to an example embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and a next-generation communication technology, e.g., a new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to an example embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an example embodiment, the antenna module 197 may include an antenna including a radiating element including a conductive material or a conductive pattern formed in or on a substrate (e.g., a printed circuit board (PCB)). According to an example embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to an example embodiment, another component (e.g., a radio frequency integrated circuit (RFIC)) other than the radiating element may be additionally formed as a part of the antenna module 197.

According to various example embodiments, the antenna module 197 may form a mmWave antenna module. According to an example embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an example embodiment, commands or data may be transmitted or received between the electronic device 101 and the external electronic device 104 via the server 108 coupled with the second network 199. Each of the external electronic devices 102 or 104 may be a device of the same type as or a different type from the electronic device 101. According to an example embodiment, all or some of operations to be executed by the electronic device 101 may be executed at one or more of the external electronic devices 102 and 104, and the server 108. For example, if the electronic device 101 needs to perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an example embodiment, the external electronic device 104 may include an Internet-of-things (IoT) device. The server 108 may be an intelligent server using machine learning and/or a neural network. According to an example embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
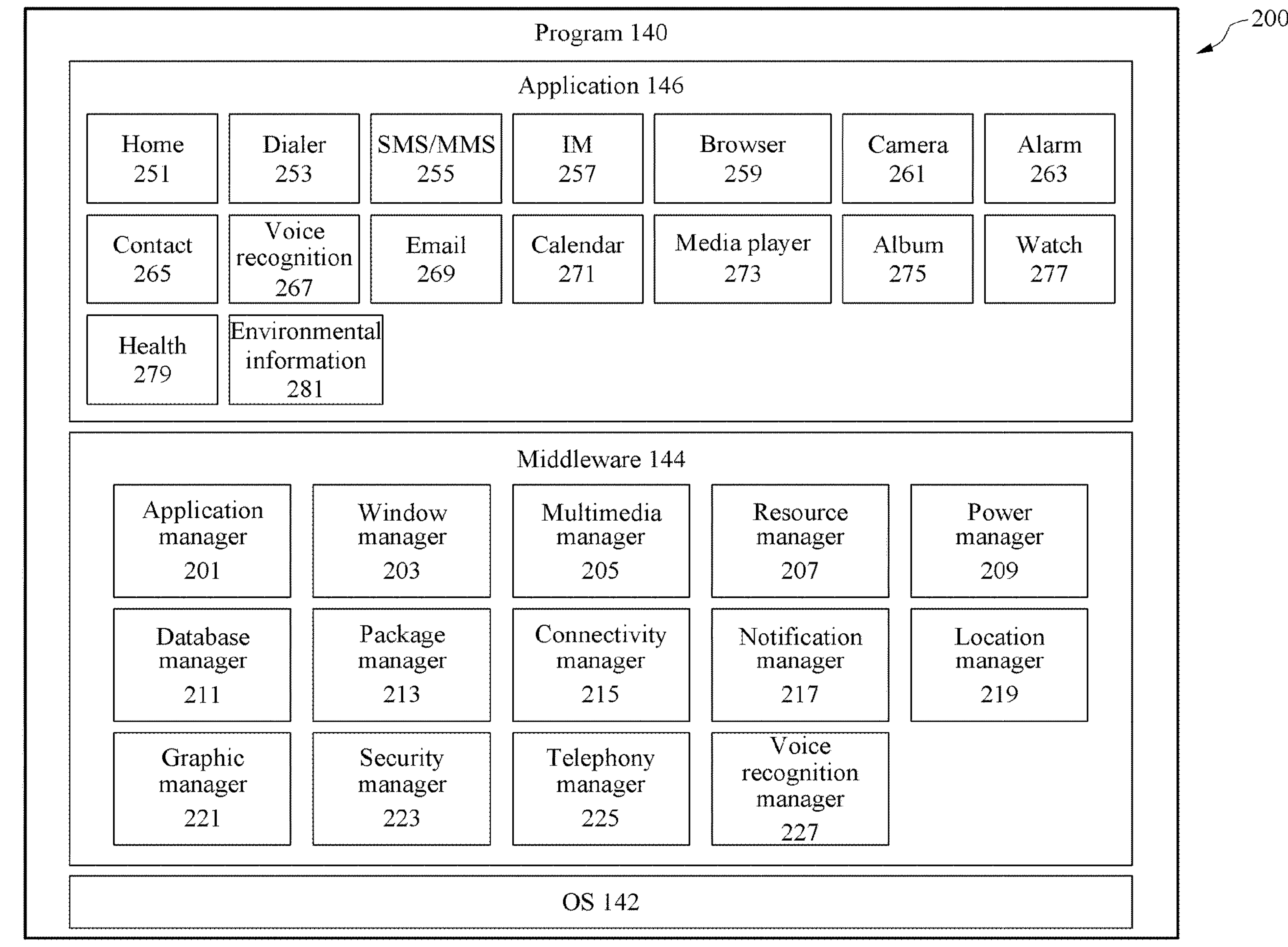
FIG. 2 is a block diagram illustrating an example configuration of a program according to various embodiments.

FIG. 2 is a block diagram 200 illustrating an example configuration of a program 140 according to various embodiments. According to an example embodiment, the program 140 may include an OS 142 to control one or more resources of the electronic device 101, middleware 144, or an application 146 executable in the OS 142. The OS 142 may include, for example, Android™, iOS™, Windows™, Symbian™, Tizen™, or Bada™. At least part of the program 140, for example, may be pre-loaded on the electronic device 101 during manufacture, or may be downloaded from or updated by an external electronic device (e.g., the electronic device 102 or 104, or the server 108) during use by a user.

The OS 142 may control management (e.g., allocation or deallocation) of one or more system resources (e.g., a process, a memory, or a power source) of the electronic device 101. The OS 142 may additionally or alternatively include other one or more driver programs to drive other hardware devices of the electronic device 101, for example, the input module 150, the sound output module 155, the display module 160, the audio module 170, the sensor module 176, the interface 177, the haptic module 179, the camera module 180, the power management module 188, the battery 189, the communication module 190, the SIM 196, or the antenna module 197.

The middleware 144 may provide various functions to the application 146 such that a function or information provided from one or more resources of the electronic device 101 may be used by the application 146. The middleware 144 may include, for example, an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony manager 225, or a voice recognition manager 227.

The application manager 201 may, for example, manage the life cycle of the application 146. The window manager 203, for example, may manage one or more graphical user interface (GUI) resources that are used on a screen. The multimedia manager 205, for example, may identify one or more formats to be used to play media files, and may encode or decode a corresponding one of the media files using a codec appropriate for a corresponding format selected from the one or more formats. The resource manager 207, for example, may manage the source code of the application 146 or a memory space of the memory 130. The power manager 209, for example, may manage the capacity, temperature, or power of the battery 189, and may determine or provide related information to be used for the operation of the electronic device 101 based on at least in part on corresponding information of the capacity, temperature, or power of the battery 189. According to an example embodiment, the power manager 209 may interwork with a basic input/output system (BIOS) (not shown) of the electronic device 101.

The database manager 211, for example, may generate, search, or change a database to be used by the application 146. The package manager 213, for example, may manage installation or update of an application that is distributed in the form of a package file. The connectivity manager 215, for example, may manage a wireless connection or a direct connection between the electronic device 101 and the external electronic device. The notification manager 217, for example, may provide a function to notify a user of an occurrence of a specified event (e.g., an incoming call, a message, or an alert). The location manager 219, for example, may manage location information on the electronic device 101. The graphic manager 221, for example, may manage one or more graphic effects to be offered to a user or a user interface related to the one or more graphic effects.

The security manager 223, for example, may provide system security or user authentication. The telephony manager 225, for example, may manage a voice call function or an image call function provided by the electronic device 101. The voice recognition manager 227, for example, may transmit user's voice data to the server 108, and may receive, from the server 108, a command corresponding to a function to be executed on the electronic device 101 based on at least in part on the voice data, or text data converted based on at least in part on the voice data. According to an example embodiment, the middleware 144 may dynamically delete some existing components or add new components. According to an example embodiment, at least part of the middleware 144 may be included as part of the OS 142 or may be implemented as another software separate from the OS 142.

The application 146 may include, for example, a home 251, dialer 253, short message service (SMS)/multimedia messaging service (MMS) 255, instant message (IM) 257, browser 259, camera 261, alarm 263, contact 265, voice recognition 267, email 269, calendar 271, media player 273, album 275, watch 277, health 279 (e.g., for measuring the degree of workout or biometric information, such as blood sugar), or environmental information 281 (e.g., for measuring air pressure, humidity, or temperature information) application. According to an example embodiment, the application 146 may further include an information exchanging application (not shown) that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101.

The device management application may control the power (e.g., turn-on or turn-off) or the function (e.g., adjustment of brightness, resolution, or focus) of an external electronic device that communicates with the electronic device 101 or a portion of components thereof (e.g., a display module or a camera module of the external electronic device). The device management application may additionally or alternatively support installation, delete, or update of an application running on the external electronic device.

The electronic device according to various example embodiments may be one of various types of electronic devices. The electronic device may include, for example, a portable communication device (e.g., a smartphone), a computer device, a portable multimedia device, a portable medical device, a camera, a wearable device, or a home appliance device. According to an example embodiment of the disclosure, the electronic device is not limited to those described above.

It should be appreciated that various example embodiments of the present disclosure and the terms used therein are not intended to limit the technological features set forth herein to particular embodiments and include various changes, equivalents, or replacements for a corresponding embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B", "at least one of A and B", "at least one of A or B", "A, B or C", "at least one of A, B and C", and "A, B, or C," each of which may include any one of the items listed together in the corresponding one of the phrases, or all possible combinations thereof. Terms such as "first", "second", or "first" or "second" may simply be used to distinguish the component from other components in question, and may refer to components in other aspects (e.g., importance or order) is not limited. It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various example embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an example embodiment, the module may be implemented in a form of an application-specific integrated circuit (ASIC).

Various example embodiments as set forth herein may be implemented as software (e.g., the program 140) including one or more instructions that are stored in a storage medium (e.g., the internal memory 136 or the external memory 138) that is readable by a machine (e.g., the electronic device 101) For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Here, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various example embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various example embodiments, each component (e.g., a module or a program) of the above-described components may include a single entity or multiple entities, and some of the multiple entities may be separately disposed in different components. According to various example embodiments, one or more of the above-described components may be omitted, or one or more other components may be added. Alternatively or additionally, a plurality of components (e.g., modules or programs) may be integrated into a single component. In such a case, according to various example embodiments, the integrated component may still perform one or more functions of each of the plurality of components in the same or similar manner as they are performed by a corresponding one of the plurality of components before the integration. According to various example embodiments, operations performed by the module, the program, or another component may be carried out sequentially, in parallel, repeatedly, or heuristically, or one or more of the operations may be executed in a different order or omitted, or one or more other operations may be added.

Figure 3:
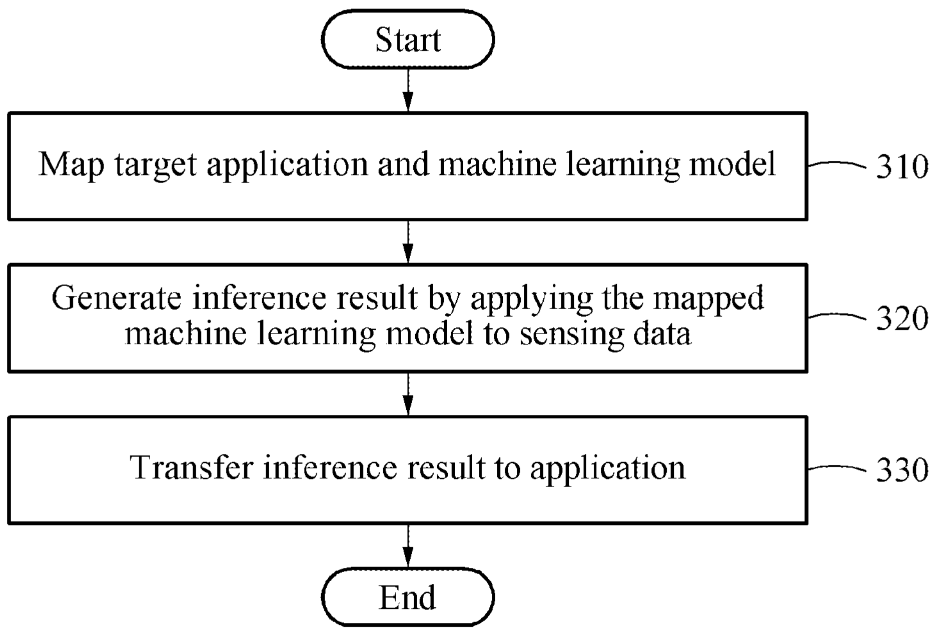
FIG. 3 is a flowchart illustrating an example method of using a shared machine learning model according to various embodiments.

FIG. 3 is a flowchart illustrating an example method of using a shared machine learning model according to various embodiments.

In operation 310, a processor of an electronic device (e.g., the electronic device 101 of FIG. 1) according to an example embodiment may map a target application and a machine learning model. For example, the electronic device may map a target application to a machine learning model matched to a request of the target application among a plurality of machine learning models. A machine learning model may be a pre-trained artificial intelligence model, and may be a model designed to output data in response to input data. The plurality of machine learning models may have various input data formats and output data formats. Data formats of the plurality of machine learning models will be described in greater detail below with reference to FIG. 4.

The target application may indicate an application that requires an inference operation using a machine learning model among a plurality of applications installed in the electronic device. The target application may perform an inference operation of the target application using an internal machine learning model included in the target application, or may delegate an inference operation to a machine learning model external to the target application. For example, the electronic device may map the target application to a machine learning model to which the inference operation of the target application is to be delegated. After the machine learning model is mapped to the target application, the inference operation of the target application may be performed using the mapped machine learning model. In the following description, a machine learning model may be a machine learning model outside a target application.

The request of the target application may indicate a request for delegation of the inference operation of the target application. For example, the request of the target application may include an identifier (e.g., a model name) of the target application among a plurality of machine learning models. The target application may send a request for a selection of a machine learning model matched to an input/output data format (e.g., a format and/or a type of input/output data) required for the inference operation of the target application and for mapping the target application to the selected machine learning model.

In operation 320, the electronic device may generate an inference result by applying the mapped machine learning model to sensing data. For example, when sensing data corresponding to the machine learning model is sensed by one or more sensors, the electronic device may generate an inference result by applying the mapped machine learning model to the sensing data. The electronic device may generate output data according to the inference operation as an inference result by inputting the sensing data to the machine learning model. For example, the electronic device may apply an operation (e.g., a convolution operation, a pooling operation, and an operation of propagating input data to a plurality of artificial neural network layers) according to the machine learning model to the sensing data, to generate an inference result.

The inference result may be a result obtained by inferring, estimating, predicting, identifying, verifying, and/or recognizing one task based on sensing data. For example, a task may include object recognition, speech recognition, and estimation of a danger level of a device. An inference result for one task may include an estimated label and/or output value for the task. In an example, a label included in an inference result for one task may indicate at least one of a plurality of classes according to classification of the task. In another example, an output value included in an inference result for one task may be a probability value for each class and/or a regression value for a target of the task.

For example, when the sensing data is image data, the inference result may be an object detection result, an object classification result, and/or a facial expression recognition result. The object detection result may be a result obtained by detecting, extracting, and/or dividing a region corresponding to an object portion of image data. The object classification result may be a result obtained by classifying an object detected in image data into an object label, and the object label may indicate an attribute of an object. In an example, the object classification result may be a result obtained by classifying a detected object as one of a cat, a dog, a human, and a vehicle. In another example, the object classification result may be a result obtained by classifying a detected object as one of a hand, an arm, a face, a leg, and other body parts of a human. The facial expression recognition result may be a result obtained by recognizing a detected human facial expression as a label corresponding to one of a plurality of emotions (e.g., anger, happiness, sadness, and neutral).

For example, when the sensing data is sound data, the inference result may be a danger sound detection result, a sound identification result, and/or a voice recognition result. The danger sound detection result may be a result obtained by detecting sound (e.g., sound of an approaching vehicle) associated with a danger approaching a user. The sound identification result may be a result obtained by classifying sounds included in sensed sound data into labels, and a sound label may represent an attribute of sound. The sound identification result may be, for example, a result obtained by classifying a detected sound source as one of a vehicle, a human, and an animal. The voice recognition result may be a result obtained by recognizing a human utterance and/or a conversation from sound data, and may be, for example, a text extraction result and/or a voice command corresponding to a human utterance.

For example, when the sensing data is system data, the inference result may include a system danger detection result. The system data may include, for example, temperature data and current data. In an example, the system danger detection result may be a result indicating whether an electronic device is in danger (e.g., overcurrent). In another example, the system danger detection result may be a danger level (e.g., a possibility of battery explosion) of an electronic device.

However, the above-described inference results are merely examples provided to aid in understanding, and the various embodiments are not limited thereto. Inference results with different formats may be generated according to a design for each of a multi-class classification task, a multi-label classification task, and/or a regression task.

In operation 330, the electronic device may transfer the inference result to an application. For example, the electronic device may transmit the generated inference result to at least one of the target application and another application mapped to the machine learning model. When a plurality of applications are mapped to a machine learning model, every time an inference result using a corresponding machine learning model is generated, the electronic device may transmit the inference result to the plurality of applications. However, the example embodiments are not limited thereto. The electronic device may select at least one application from the plurality of applications and may transmit the inference result to the at least one selected application when generating the inference result using the corresponding machine learning model. A machine learning model to which a plurality of applications are mapped may be a single model, but is not limited thereto, and may be a model in which a plurality of artificial intelligence models are combined. The same combination of machine learning models may be equally mapped to the plurality of applications.

The electronic device may perform data collection and inference operations by sharing a machine learning model by executing various applications requiring the machine learning model, thereby reducing resources. For example, the electronic device may detect sensing data in a state in which an application is deactivated, and may calculate an inference result by applying a machine learning model to the sensed sensing data. The electronic device may prevent and/or reduce an unnecessary operation and use of a random access memory (RAM) by performing the inference operation in a state in which an application is deactivated.

In the present disclosure, an application in a state of being deactivated and a deactivated application may be an application in a state in which a process of a corresponding application is stopped or does not start, and may be, for example, an application in which there is no CPU scheduling for a process of a corresponding application or in which a process is removed from a memory (e.g., a RAM). For example, the deactivated application may be an application in which a process has not started or is stopped even though the process is started after booting of the electronic device, and the process may be in a stop status or a killed status. An application in a state of being activated and an activated application may be an application in which a process of ae corresponding application is being executed in a memory (e.g., a RAM), and may be, for example, an application that operates in a foreground process and/or a background process.

In addition, the electronic device may minimize and/or reduce a space occupied by a machine learning model in a storage, by mapping the same machine learning model to a plurality of applications and using the machine learning model. For example, the electronic device may prevent and/or reduce redundant processing, using the same machine learning model for two or more applications having the same input data and output data required for inference and may minimize and/or reduce use of a RAM, to prevent and/or reduce a sluggish problem. By preventing and/or reducing the redundant processing, an increase in consumed current and an increase in a temperature of the electronic device may be suppressed. Since competitive use of an accelerator by the plurality of applications is prevented and/or reduced, computing resources may be equally distributed to the plurality of applications.

The electronic device may share a machine learning model for a plurality of applications requiring the same inference requirement, to save device processing of a CPU, a GPU, and/or a digital signal processor (DSP) and to enhance an operation speed. In addition, even though execution of an application in a foreground and/or a background is impossible due to a lack of a remaining capacity of a RAM, the electronic device may perform an inference operation required by a corresponding application regardless of execution of all the applications.

Figure 4:
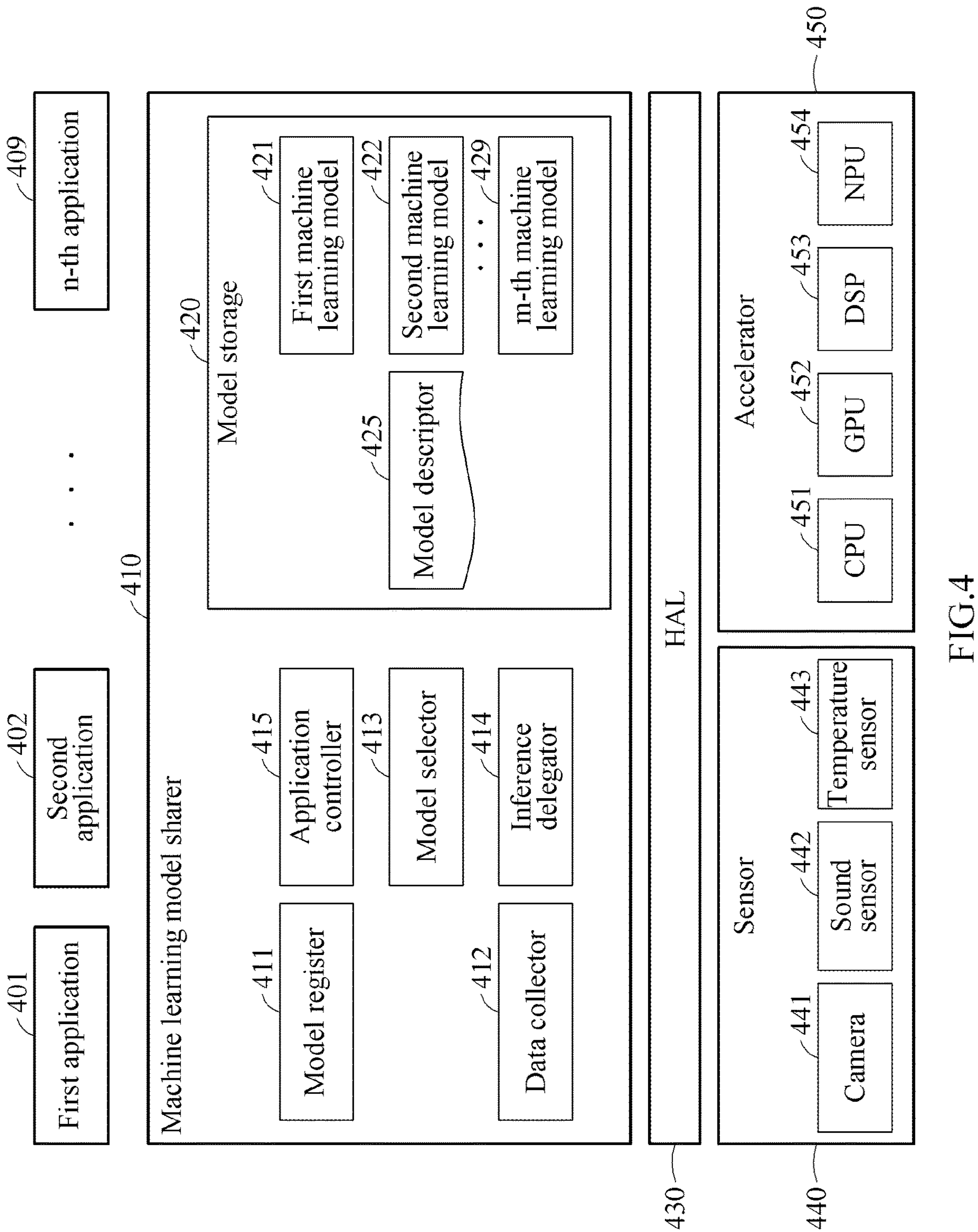
FIG. 4 is a block diagram illustrating an example configuration of a machine learning model sharer according to various embodiments.

FIG. 4 is a block diagram illustrating an example configuration of a machine learning model sharer according to various embodiments.

A machine learning model sharer 410 may include various processing circuitry and/or executable program instructions and manage sharing of a plurality of machine learning models that may be mapped to a plurality of applications (e.g., a first application 401, a second application 402, and an n-th application 409 in which "n" is an integer greater than or equal to "2") requiring an inference operation. The machine learning model sharer 410 may be implemented as a software module, a hardware module, or a combination of a software module and a hardware module. The machine learning model sharer 410 may include a model register 411, a data collector 412, a model selector 413, an inference delegator 414, an application controller 415, and a model storage 420. Each module included in the machine learning model sharer 410 may be implemented as a software module, a hardware module, or a combination of a software module and a hardware module. At least some or all of operations of the machine learning model sharer 410 that will be described below and each module included in the machine learning model sharer 410 may be performed by a processor (e.g., the processor 120 of FIG. 1).

The model register 411 may map and register a target application requiring an inference operation among the first application 401 to the n-th application 409 installed in the electronic device (e.g., the electronic device 101 of FIG. 1) to one of a plurality of machine learning models (e.g., a first machine learning model 421, a second machine learning model 422, and an m-th machine learning model 429 in which m is an integer greater than or equal to "1"). Registration of a model delegated to an application will be described in greater detail below with reference to FIG. 5.

The data collector 412 may collect data used for an inference operation. For example, the data collector 412 may collect data sensed by a sensor 440, data generated by an electronic device, and/or data generated by an external device. According to an example embodiment, the data collector 412 may acquire image data captured by a camera 441 (e.g., the camera module 180 of FIG. 1). The data collector 412 may acquire sound data captured by a sound sensor 442 (e.g., the microphone of the input module 150 of FIG. 1). The data collector 412 may acquire temperature data sensed by a temperature sensor 443 (e.g., the sensor module 176 of FIG. 1). The data collector 412 may acquire current data sensed by a current sensor (e.g., the sensor module 176 of FIG. 1). The data collector 412 may collect sensing data through a hardware abstraction layer (HAL) 430. According to an example embodiment, the data collector 412 may also collect image data that is pre-stored in the electronic device, a file (e.g., a document) written by a user, and/or content received from an external device.

The data collector 412 may collect data required in a machine learning model to which an application is mapped among a plurality of machine learning models. For example, the data collector 412 may selectively extract and collect sensing data required by a machine learning model to which an application is mapped from sensing data monitored by the sensor 440. Also, the data collector 412 may collect data according to a data type and a collection period designated for a machine learning model included in the model storage 420. For example, when "k" applications are mapped to the same machine learning model, processing resources required for data collection for an inference operation using the machine learning model may be reduced by 100/k %. In this example, "k" may be an integer greater than or equal to "2".

The model selector 413 may process data transmission among the sensor 440, the model storage 420, and applications. In an example, the model selector 413 may select a machine learning model corresponding to the sensing data sensed by the sensor 440 from a plurality of machine learning models based on the sensing data. Also, the model selector 413 may select an application to which an inference result based on the corresponding machine learning model is to be transferred. In another example, the model selector 413 may select a machine learning model that is to be activated from deactivated machine learning models, based on the sensing data.

The inference delegator 414 may delegate an inference operation to a machine learning model registered in the target application. For example, the inference delegator 414 may generate an inference result for the data collected by the data collector 412 using a machine learning model selected from a plurality of machine learning models. The inference delegator 414 may perform an operation according to the selected machine learning model using a predefined accelerator 450 when compiling.

The application controller 415 may transfer the inference result to an application. In an example, every time an inference result based on the selected machine learning model is generated, the application controller 415 may transmit the generated inference result to a target application mapped to the selected machine learning model. In another example, when an output value included in an inference result based on the selected machine learning model exceeds a threshold range, the application controller 415 may transmit the inference result to a target application mapped to the selected machine learning model. In another example, when a target application mapped to a machine learning model is deactivated, the application controller 415 may activate the deactivated application.

The model storage 420 may include the plurality of applications, for example, the first machine learning model 421, the second machine learning model 422, and the m-th machine learning model 429. The plurality of machine learning models may be stored in a memory space different from a memory space in which a plurality of applications (e.g., a target application) are stored. The model storage 420 may include a model descriptor 425 including information about an input/output data format defined for an inference operation of each machine learning model. The plurality of machine learning models may be stored in a space of a memory of an electronic device or a space of a memory of an external device (e.g., a server).

The model descriptor 425 may include, for example, a model name, an input type, an input source, an input format, an output format, whether to wake up an application, an output type, and an output label list of each machine learning model. The model descriptor 425 of each machine learning model may include, for example, an input type, an input source, an input format, an output type, a label list, and an output format, as shown in Table 1 below.

TABLE 1

| Item | Description | Example |
|---|---|---|
| Input type | Type of data used as an input | 1. image<br>2. sound<br>3. etc. |
| Input source | Source of sensing data to be used as an input | 1. self (input in app)<br>2. camera<br>3. mic<br>4. Temp<br>5. current<br>6. illuminance<br>7. screen touch<br>8. grab sensor |
| Input format | Format of data to be used as an input | 1. (1, 224, 224, 3)<br>2. (10, 224, 224, 3)<br>3. (1, 1000) |
| Output type | Type of output data | 1. object detection<br>2. classification<br>3. etc. |
| Label list | Label to be provided as output | 1. {Cat, dog, car}<br>2. {Happy, sad, angry}<br>3. {Hot, cold} |
| Output format | Format of output data | 1. (1, 1)<br>2. (3, 4)<br>3. (1, 1000) |

In Table 1, the input type may be a type of data used as an input and may include, for example, an image, sound, a temperature, and current. The input source may be a source of data and may indicate a sensor module that senses data or an application that provides data. For example, "self" may be data that is pre-processed, processed, and/or provided in an application, and may indicate, for example, an input source of an image pre-stored in an album. Also, "camera" may indicate an input source of image data captured by the camera 441, and "mic" may indicate an input source of sound data captured by a microphone. In addition, "temp" may indicate an input source of temperature data sensed by the temperature sensor 443, and may describe a surface temperature predicted based on sensed temperatures of different portions of an electronic device. Also, "current" may indicate an input source of current data sensed by a current sensor and may be measured by a power gauge, for example. "illuminance" may indicate an input source of illuminance data sensed by an illuminance sensor, and "screen touch" may indicate an input source of touch data sensed by a touch screen. Also, "grab sensor" may indicate an input source of grab data sensed by a grab sensor. The input format may represent a vector dimension of input data. For example, (1, 224, 224, 3) may indicate a 1×224×224×3-dimensional input format. A single image captured by the camera 441 may be a vector dimension of input data indicating pixel values for each of "224" pixels in width, "224" pixels in height, and three color channels (e.g., red, green, and blue channels). The output type may be a type of output data and may indicate whether an inference result is object detection, classification, and other recognition. The label list may be a list of labels classified by tasks. For example, in the case of object classification, the label list may include a cat, a dog, a vehicle, and other object labels. In the case of facial expression recognition, the label list may include happiness, sadness, anger, and other emotion labels. The output format may indicate a vector dimension of output data, similarly to the input format. However, Table 1 is merely an example provided to aid in understanding, and the formats of the input/output data are not limited thereto.

In an example, in a descriptor of a machine learning model for image classification, the model name may be "img_classifier", the input type may be "image", the input source may be "self", the input format may be "(1,224,224, 3)", the output format may be "(1,1000)", whether to wake up an application may be "no", the output type may be "classification", and the output label list may be "dog,cat, bear". In another example, in a descriptor of a machine learning model for checking a temperature, the model name may be "temp_checker", the input type may be "etc", the input source may be "temp", the input format may be "(1,5)", the output format may be "(1, 3)", whether to wake up an application may be "yes", the output type may be "warning", and the label list may be "hot,cold". In another example, in a descriptor of a machine learning model for checking a spoken word, the model name may be "word_checker", the input type may be "sound", the input source may be "mic", the input format may be "(10,300)", and the output format may be "(1,3)", whether to wake up an application may be "yes", the output type may be "warning", and the label list may be "hi,hello".

The plurality of applications may perform a subsequent operation based on a received inference result. A subsequent operation may include data processing based on the inference result. The target application may request fast sampling for fast data processing. For example, a data collection period may be reduced for fast sampling according to a request of an application.

The accelerator 450 may be set for an inference operation of a machine learning model, and may include at least one or a combination of two or more of a CPU 451, a GPU 452, a DSP 453, and an NPU 454. The electronic device may generate an inference result by implementing a machine learning model on sensing data, using the accelerator 450.

In the present disclosure, an example in which the first application 401 and the second application 402 are mapped to the first machine learning model 421 is described for convenience of description, however, the example embodiments are not limited thereto. Mapping between an application and a machine learning model may vary depending on application settings and/or user settings.

Figure 5:
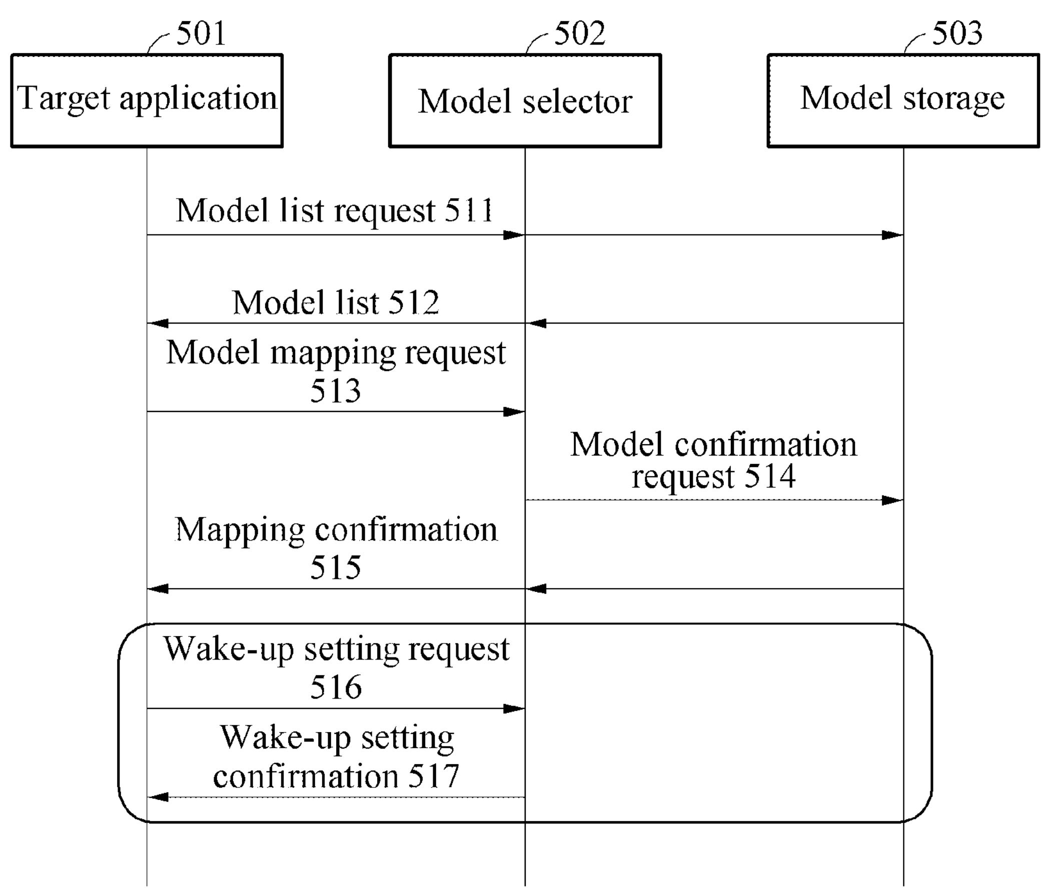
FIG. 5 is a signal flow diagram illustrating an example operation of mapping and registering an application and a machine learning model according to various embodiments.

FIG. 5 is a signal flow diagram illustrating an example operation of mapping and registering an application and a machine learning model according to various embodiments.

An electronic device (e.g., the electronic device 101 of FIG. 1) may perform operations for mapping and registration of a machine learning model in response to a user input when a target application 501 (e.g., the first application 401 of FIG. 4) is installed and/or while the target application 501 is being executed.

In operation 511, the target application 501 may send a model list request. A model selector 502 (e.g., the model selector 413 of FIG. 4) may transfer the model list request of the target application 501 to a model storage 503 (e.g., the model storage 420 of FIG. 4).

In operation 512, the target application 501 may receive a model list from the model storage 503 via the model selector 502. The model list may include a model descriptor (e.g., the model descriptor 425 of FIG. 4). The model descriptor may include a definition of an input/output data format of each machine learning model.

In operation 513, the target application 501 may send a model mapping request. For example, the target application 501 may determine a machine learning model matching the target application 501, based on at least one or a combination of two or more of a type of input data required in an inference operation of a target application, a format of the input data, an input source, a type of output data, a label list of the output data, and a format of the output data, among a plurality of machine learning models. For example, the target application 501 may search for a machine learning model matching an input/output data format of the target application 501 and may determine the found machine learning model. The target application 501 may extract machine learning models matching an input type required by the target application 501 from the model list. The target application 501 may extract a machine learning model matching an input format from the extracted machine learning models. The target application 501 may determine a machine learning model that meets requirements of the target application 501, sequentially based on the input type, the input format, the input source, the output type, the label list, and the output format. When a plurality of machine learning models meet the requirements of the target application 501, the target application 501 may select a machine learning model to be mapped to the target application 501 from the plurality of machine learning models, in response to a user input. The target application 501 may send a model mapping request for mapping with the determined machine learning model.

However, the example embodiments are not limited thereto. For example, when information (e.g., a model name) of a machine learning model predefined to be mapped to the target application 501 is provided, the target application 501 may skip a model search and identification procedure and may immediately send a request for matching with the predefined machine learning model.

In operation 514, the model selector 502 may send a model confirmation request for the determined machine learning model to the model storage 503.

In operation 515, the target application 501 may receive a mapping confirmation that the target application 501 is mapped to the determined machine learning model from the model storage 503.

In operation 516, the target application 501 may send a wake-up setting request to the model selector 502. Wake-up may be an operation of activating a deactivated application. The target application 501 may set a wake-up condition of the target application 501. For example, the target application 501 may send a request for setting of a reference label and/or a threshold range that is a wake-up criterion. For reference, for a plurality of applications mapped to the same machine learning model, different threshold ranges and/or different reference labels may be set. Based on whether a threshold range is satisfied and/or a reference label is satisfied according to circumstances, the plurality of applications may be simultaneously operated, or only some of the plurality of applications may be operated, which will be described below with reference to FIG. 7A.

In operation 517, the target application 501 may receive a confirmation that the wake-up setting is completed.

Through the wake-up setting, the electronic device may wake up an application in response to a defined situation and perform a designated task, instead of allowing the target application 501 to reside in a memory or continuously using a CPU. The electronic device may reduce RAM usage and CPU usage.

An inference period and a frequency of data sampling may be additionally set. Additional settings including whether to wake up an application and a sampling frequency are described below with reference to Table 2.

TABLE 2

| Item | Set value | Description |
|---|---|---|
| Selection model | 4 | Numeral indicating a machine learning model |
| Sampling | 5 | Sampling/sec (sampling frequency per second) |
| Background | True | Whether an application is executed when the application is in the background |
| Wake up | True | Whether to activate a deactivated application |
| Threshold | Hot | Threshold/reference label as a wake-up criterion |

For reference, although data is exchanged between the model storage 503 and the target application 501 via the model selector 502 as illustrated in FIG. 5, the example embodiments are not limited thereto. A processor of the electronic device may also perform the above-described operation.

Figure 6:
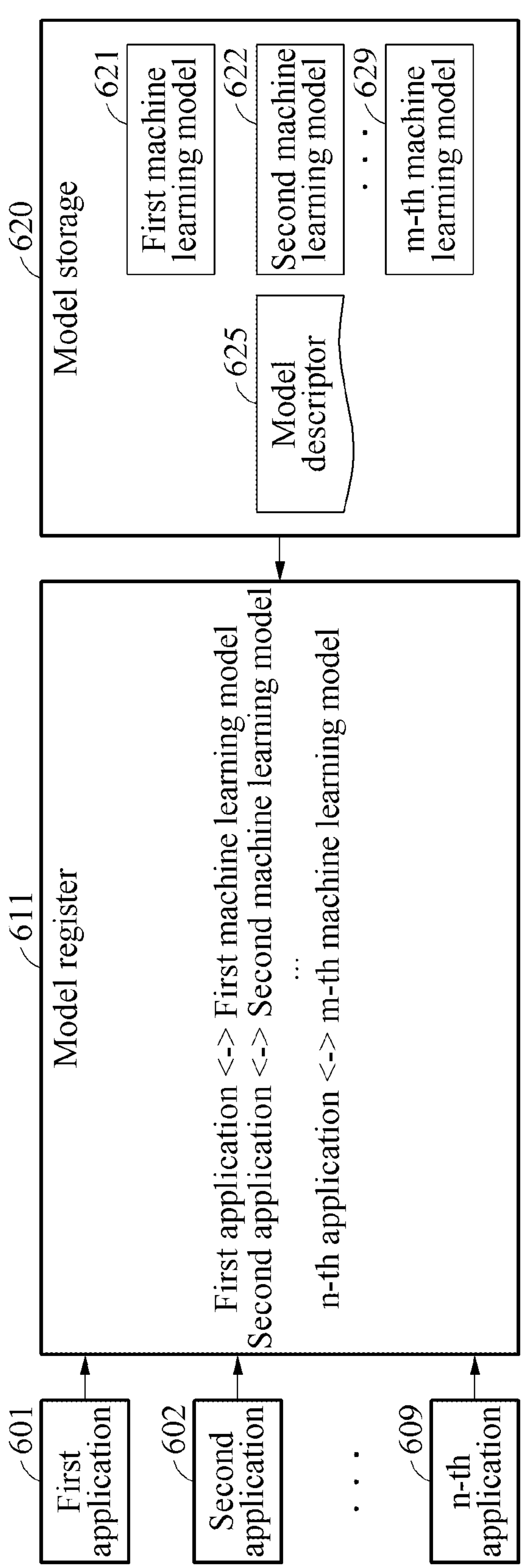
FIG. 6 is a diagram illustrating an example of a mapping result of FIG. 5 according to various embodiments.

FIG. 6 is a diagram illustrating an example of a mapping result of FIG. 5 according to various embodiments.

According to an example embodiment, a model register 611 (e.g., the model register 411 of FIG. 4) may map and register a machine learning model of a model storage 620 (e.g., the model storage 420 of FIG. 4) to a plurality of applications, for example, a first application 601 (e.g., the first application 401 of FIG. 4), a second application 602 (e.g., the second application 402 of FIG. 4), and an n-th application 609 (e.g., the n-th application 409 of FIG. 4). The model register 611 may map a machine learning model selected based on a model descriptor 625 by a model selector (e.g., the model selector 413 of FIG. 4) to a target application, as described above with reference to FIG. 5.

In the example of FIG. 6, the model registrar 611 may map the first application 601 and the second application 602 together to a first machine learning model 621 (e.g., the first machine learning model 421 of FIG. 4). The model register 611 may map the n-th application 609 to an m-th machine learning model 629 (e.g., the m-th machine learning model 429 of FIG. 4). A second machine learning model 622 (e.g., the second machine learning model 422 of FIG. 4) may also be mapped to another application. However, the example embodiments are not limited thereto, and a portion of machine learning models may not be mapped to an application.

Hereinafter, examples of operations of the first application 601 and the second application 602 mapped to the first machine learning model 621 will be described in greater detail.

Figure 7A:
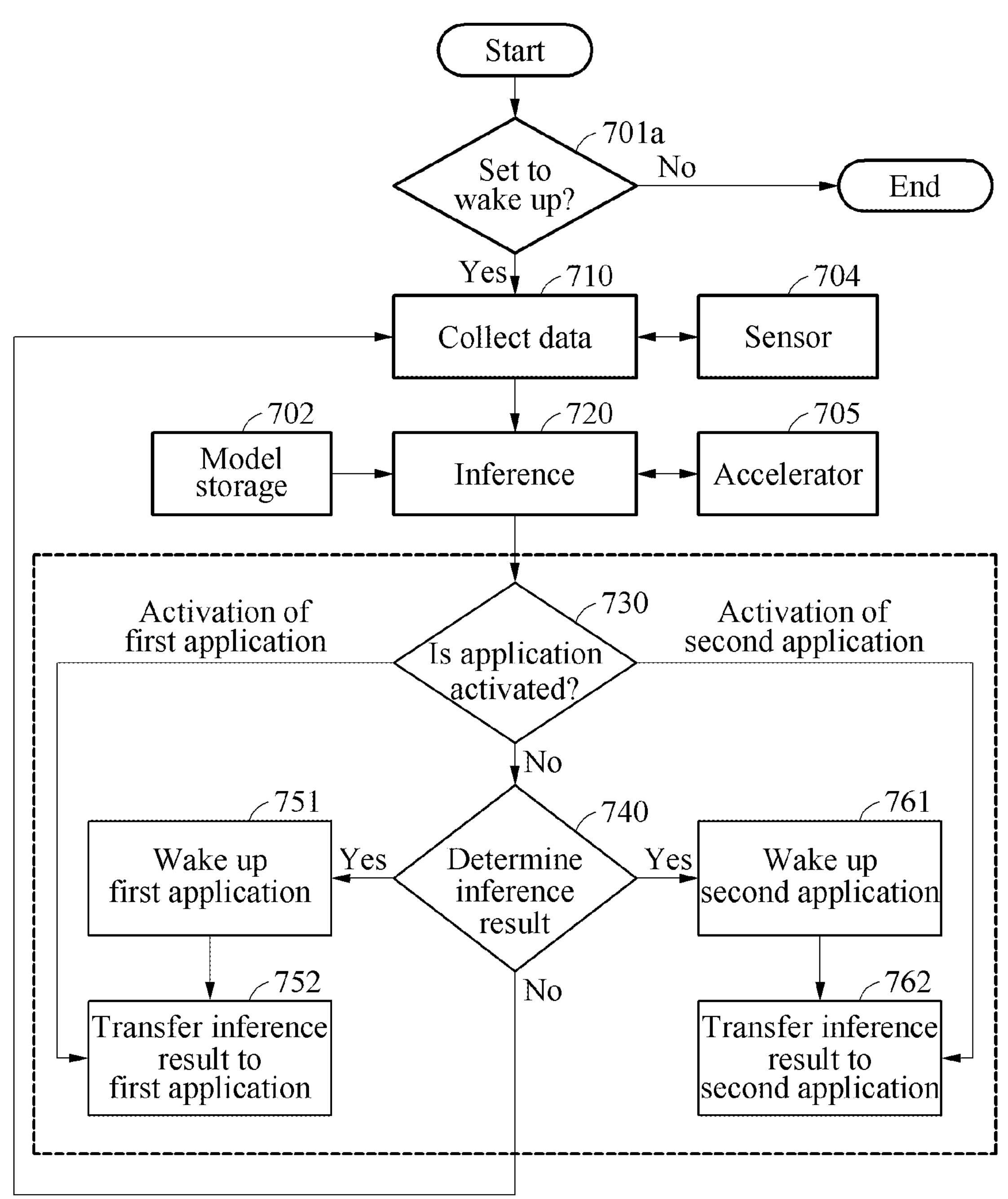
FIGS. 7A and 7B are flowcharts illustrating examples of an inference operation using a shared machine learning model according to various embodiments.
Figure 7B:
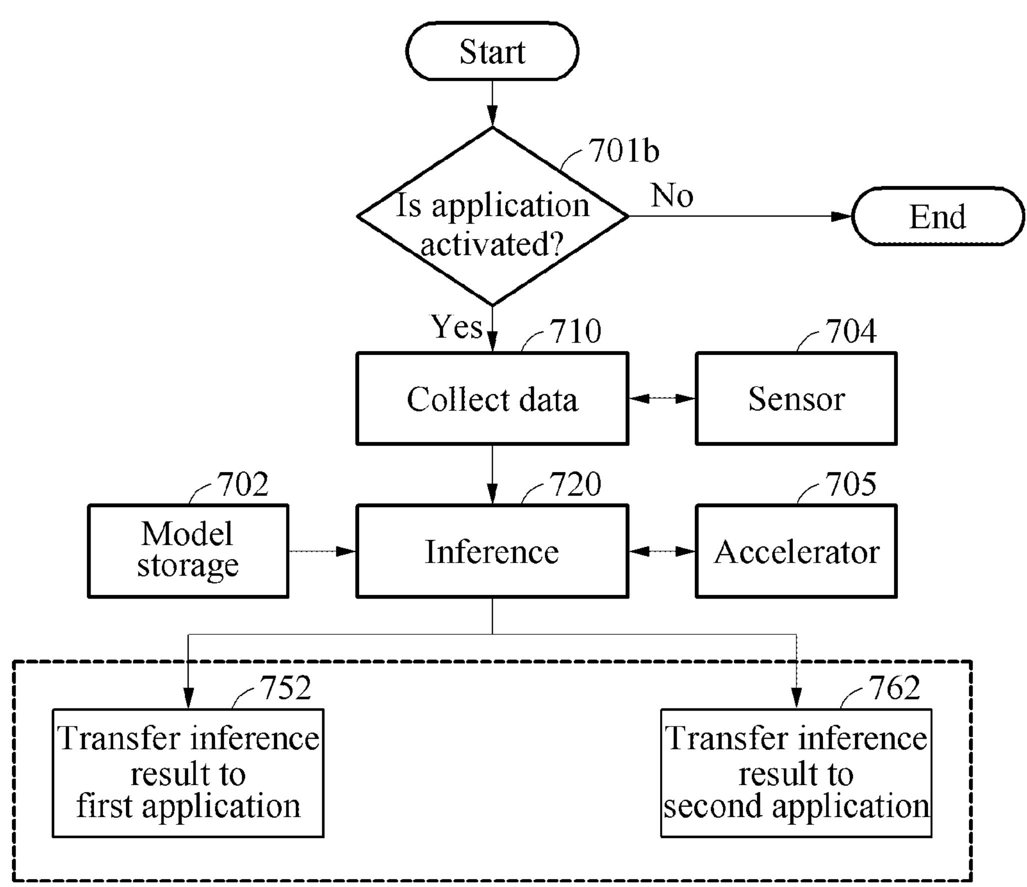

FIGS. 7A and 7B are flowcharts illustrating examples of an inference operation using a shared machine learning model according to various embodiments.

FIG. 7A illustrates an operation when at least one of a plurality of applications is set to wake up.

In operation 701*a*, an electronic device (e.g., the electronic device 101 of FIG. 1) may determine whether at least one of a plurality of applications is set to wake up. When there is no application set to wake up among a plurality of applications mapped to a machine learning model, the electronic device may terminate an operation related to wake-up. When an application set to wake up is present, the electronic device may continue to perform an operation related to wake-up. In FIG. 7A, an example in which a first application (e.g., the first application 401 of FIG. 4) and a second application (e.g., the second application 402 of FIG. 4) are set to wake up is illustrated.

In operation 710, the electronic device may collect sensing data from a sensor 704 (e.g., the sensor 440 of FIG. 4).

When sensing data corresponding to a machine learning model is sensed, the electronic device may generate an inference result by applying a mapped machine learning model to the sensing data in operation 720. For example, the electronic device may select a machine learning model corresponding to the sensing data among a plurality of machine learning models included in a model storage 702 (e.g., the model storage 420 of FIG. 4) and may implement the selected machine learning model using an accelerator 705 (e.g., the accelerator 450 of FIG. 4). When an application mapped to a machine learning model is deactivated, the electronic device may generate an inference result using the machine learning model before the application is activated.

In operation 730, the electronic device may determine whether an application set to wake up is activated. For example, the electronic device may determine whether an application mapped to a machine learning model is in an activated state. When the application is activated, the electronic device may transmit the inference result to the application, without waking up the application, in operations 752 and 762, for example. When the application is deactivated, the electronic device may determine whether to wake up the application based on an inference result determined in operation 740 that will be described below.

An example in which the first application and the second application are mapped to a machine learning model is described with reference to FIG. 7A. When the first application is activated, the electronic device may determine that there is no need to wake up the first application and may transfer the inference result to the first application in operation 752. Similarly, when the second application is activated, the electronic device may determine that there is no need to wake up the second application and may transmit the inference result to the second application in operation 762. The electronic device may provide the generated inference result to a target application that operates in one of a foreground process and a background process and another application that operates in one of the foreground process and the background process. However, the example embodiments are not limited thereto. As described in Table 2, when an inference in the background process is disenabled, the electronic device may restrict transferring the inference result to an application operating in the background process.

In operation 740, the electronic device may determine the inference result, to determine whether to activate a deactivated application. The electronic device may activate a corresponding application based on the inference result. According to an example embodiment, the electronic device may activate the deactivated application based on at least one of an estimated label and an output value included in the inference result. In the example of FIG. 7A, a wake-up condition of the first application may be set as a threshold range for the output value, and a wake-up condition of the second application may be set as a reference label for the estimated label of the inference result. When the inference result does not meet the wake-up condition, the electronic device may continue to collect data in operation 710.

In operation 751, the electronic device may wake up the first application based on the inference result. In an example, when the output value included in the inference result is out of the threshold range, the electronic device may activate the deactivated application. In another example, when the output value included in the inference result is within the threshold range, the electronic device may maintain a state of the deactivated application. In operation 752, the electronic device may transfer the inference result to the first application. For example, the sensing data may include temperature data and current data, and the inference result may include a possibility of an occurrence of danger and a degree of danger. When the degree of risk is out of a threshold range, the electronic device may perform an operation of managing a temperature and current to reduce the degree of danger, by executing the first application for power management.

In operation 761, the electronic device may wake up the second application based on the inference result. For example, when the estimated label included in the inference result is matched to a reference label registered in a deactivated application, the electronic device may activate the deactivated application. In operation 762, the electronic device may transfer the inference result to the activated second application. For example, the inference result may include a degree of danger and a possibility of an occurrence of danger estimated based on a temperature and current. When the estimated label included in the inference result indicates a dangerous situation (e.g., an imminent explosion of a battery), the electronic device may provide a user with a warning related to a temperature and current by executing the second application for urgent warning.

According to an example embodiment, after the deactivated application is activated, every time another inference result is generated, the electronic device may provide the other inference result to a corresponding application. The other inference result may be a subsequent inference result generated after the inference result used for wake-up.

The electronic device may wake up either one or both of the first application and the second application, or may transfer the inference result to either one or both of the first application and the second application. The electronic device may perform the same data collection and inference operations on the first application and the second application that require the same input data while performing different functions, and thus a resource usage efficiency may be enhanced.

FIG. 7B illustrates an operation in an example in which an application is not set to wake up.

In operation 701*b*, an electronic device may determine whether at least one of a plurality of applications is activated. When all a plurality of applications mapped to a machine learning model are deactivated, the electronic device may terminate an inference-related operation. When at least one application is activated, the electronic device may continue to perform the inference-related operation. In FIG. 7B, an example in which a first application and a second application are activated is illustrated.

Operations 710, 720, 752, and 762 of FIG. 7B are the same as or similar to those described above with reference to FIG. 7A, and thus detailed description thereof may not be repeated here. However, unlike the example of FIG. 7A, in FIG. 7B, the electronic device may skip additional operations (e.g., operations 730, 740, 751, and 761 of FIG. 7A) and may transfer an inference result generated in operation 720 to the first application and the second application in operations 752 and 762.

The operations described above with reference to FIGS. 7A and 7B are not limited to those described above and may be carried out sequentially, in parallel, repeatedly, or heuristically, or one or more of the operations may be executed in a different order or omitted, or one or more other operations may be added.

Figure 8:
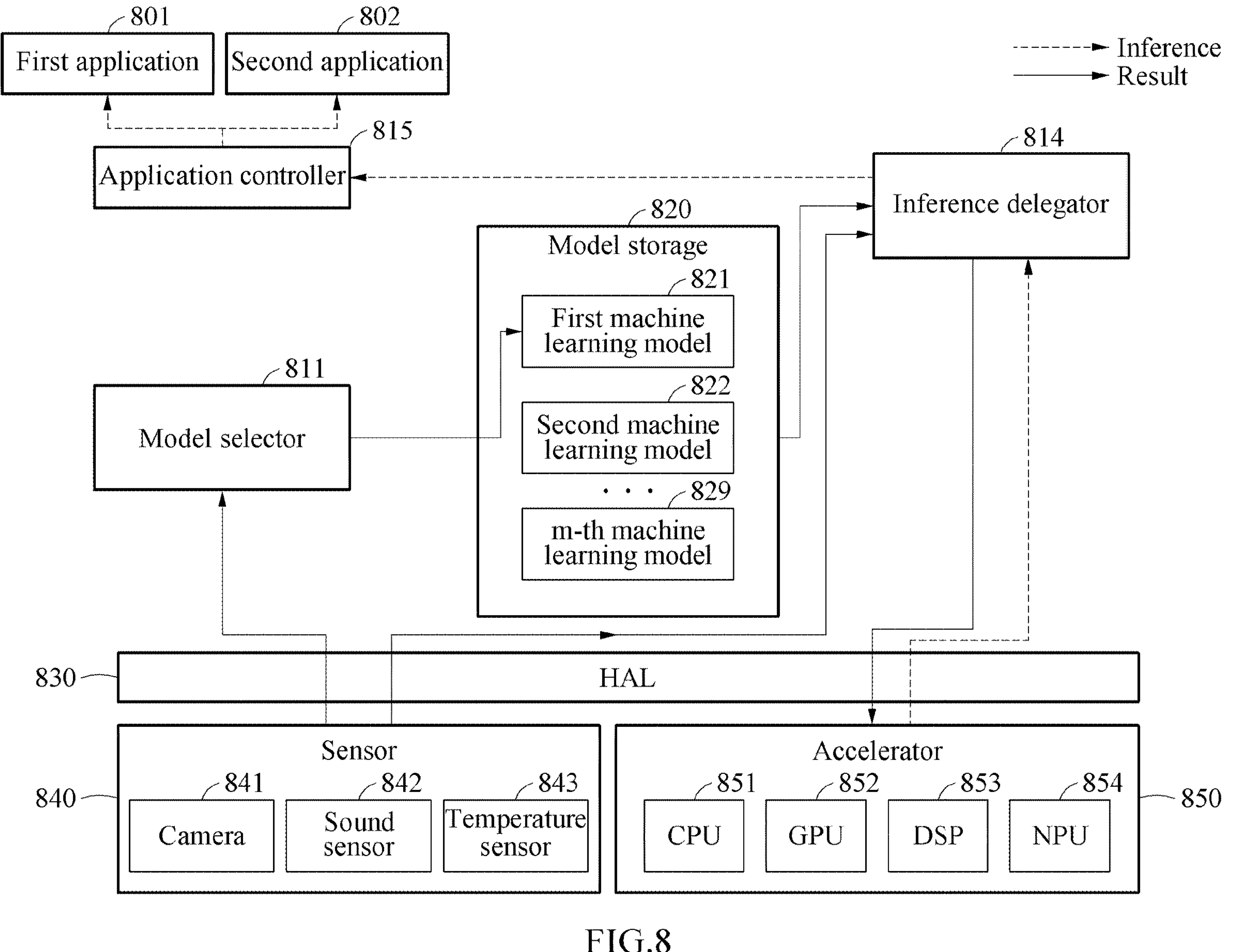
FIG. 8 is a diagram illustrating an example of transferring an inference result of a shared machine learning model to a first application and a second application according to various embodiments.

FIG. 8 is a diagram illustrating an example of transferring an inference result of a shared machine learning model to a first application and a second application according to various embodiments.

An electronic device (e.g., the electronic device 101 of FIG. 1) may collect sensing data from a sensor 840 (e.g., the sensor 440 of FIG. 4). The collected sensing data may be transmitted to a model selector 811 (e.g., the model selector 413 of FIG. 4) and/or an inference delegator 814 (e.g., the inference delegator 414 of FIG. 4) through a HAL 830 (e.g., the HAL 430 of FIG. 4). The model selector 811 may select a first machine learning model 821 (e.g., the first machine learning model 421 of FIG. 4) among a plurality of machine learning models, for example, the first machine learning model 821, a second machine learning model 822 (e.g., the second machine learning model 422 of FIG. 4) and an m-th machine learning model 829 (e.g., the m-th machine learning model 429 of FIG. 4) that are included in a model storage 820 (e.g., the model storage 420 of FIG. 4), based on the sensing data. The inference delegator 814 may generate an inference result for the sensing data by implementing the selected first machine learning model 821 using an accelerator 850 (e.g., the accelerator 450 of FIG. 4). The accelerator 850 may include at least one or a combination of two or more of a CPU 851, a GPU 852, a DSP 853, and an NPU 854. An application controller 815 (e.g., the application controller 415 of FIG. 4) may transfer the inference result to a first application 801 (e.g., the first application 401 of FIG. 4) and a second application 802 (e.g., the second application 402 of FIG. 4). Hereinafter, examples of operations for each of a sound recognition task, a heat generation recognition task, and an image recognition task will be described.

According to an example embodiment, the electronic device may sense sound data acquired by capturing sound generated outside the electronic device using a sound sensor 842 (e.g., the sound sensor 442 of FIG. 4) of the sensor 840 as sensing data. When a sound recognition result inferred from the sound data based on a machine learning model is matched to predetermined sound, the electronic device may activate a target application.

In an example, a hotword (e.g., "high, AAA") may be set as a reference label for the first application 801, and the first machine learning model 821 may be mapped to the first application 801. When sound data is collected, the model selector 811 may select the first machine learning model 821, and the inference delegator 814 may generate an inference result for the sound data using the selected first machine learning model 821. When the inference result for the sound data is matched to the hotword set for the first application 801, the application controller 815 may activate the first application 801. In addition, when another hotword (e.g., "high, BBB") is set for the second application 802 and when the inference result is matched to the corresponding hotword, the application controller 815 may activate the second application 802.

In another example, a first attribute (e.g., an attribute indicating music sound) of sound may be set as a reference label for the first application 801, and a second attribute (e.g., an attribute indicating sound of an approaching vehicle or dialogue sound) may be set as a reference label for the second application 802. For example, the first application 801 may be a music playback application, and the second application 802 may be an application for warning an approaching object or person. In an example, when music sound is identified as the inference result for the sound data, the application controller 815 may activate the first application 801. In another example, when danger sound or dialogue sound is identified as the inference result for the sound data, the application controller 815 may activate the second application 802. In another example, when an inference result generated while the first application 801 is being executed is the second attribute, the application controller 815 may activate the second application 802.

In another example, the first application 801 may be an application for translating a first language into a second language, and the second application 802 may be an application for recording utterances and/or conversations as text. The first application 801 and the second application 802 may operate in a foreground process and/or a background process, while being activated. Also, the application controller 815 may simultaneously transmit content of an utterance of a user inferred from the sound data based on the first machine learning model 821 to the first application 801 and the second application 802.

According to an example embodiment, the electronic device may sense, as sensing data, temperature data and/or current data of the electronic device by a temperature sensor 843 (e.g., the temperature sensor 443 of FIG. 4) and/or a current sensor of the sensor 840. When a danger recognition result inferred based on a machine learning model from the temperature data and/or the current data indicates danger, the electronic device may activate a target application.

In an example, a normal range may be set as a threshold range for the first application 801 and the second application 802. The first machine learning model 821 may output a danger level estimated from the temperature data and/or the current data. For example, when the danger level, which is an output value of an inference result, exceeds the normal range, the application controller 815 may execute the first application 801 that controls current of the electronic device and the second application 802 that warns of heat generation of the electronic device. Subsequently, the application controller 815 may transmit the inferred danger level to the first application 801 and/or the second application 802.

In another example, the first machine learning model 821 may be set to output a possibility of an occurrence of danger based on the temperature data and/or the current data. In this example, when the inference result is matched to a "danger" label, the application controller 815 may activate the first application 801 and/or the second application 802, and/or may transmit the inference result to the first application 801 and/or the second application 802.

According to an example embodiment, the electronic device may sense image data obtained by capturing a scene outside the electronic device using a camera 841 (e.g., the camera 441 of FIG. 4) of the sensor 840 as sensing data. The electronic device may activate a target application based on an image recognition result inferred from the image data based on a machine learning model. When the image recognition result inferred from the image data based on the machine learning model is matched to a predetermined object and/or a predetermined action, the electronic device may transmit the image recognition result to the target application. The action may be, for example, a movement and a motion of an object or a person appearing in the image data.

In an example, the first application 801 may be a food identification application, and the second application 802 may be a shopping support application. A camera application may be executed separately from the first application 801 and the second application 802, and the electronic device may generate an inference result from image data of the camera application using the first machine learning model 821 of the model storage 820. The camera application may operate in a background process, however, the example embodiments are not limited thereto. When a food label (e.g., a hamburger) and a tableware label (e.g., a fork) are identified based on the first machine learning model 821 from the image data, the application controller 815 may transfer the food label by activating the first application 801, and may transfer the tableware label by activating the second application 802. The first application 801 may record food calories taken by a user based on the food label, and the second application 802 may recommend a product purchase for a user based on the tableware label.

In another example, the first application 801 may be an application for guiding a driving route of a vehicle and may use the camera 841, and the second application 802 may be an application for providing a collision warning. When an object with danger of a collision is inferred based on the first machine learning model 821 from collected image data while the first application 801 is operating, the application controller 815 may activate the second application 802 and may provide the same inference result to the first application 801 and the second application 802.

As described above, the electronic device may reduce the system resource usage by integrally monitoring the same data for a plurality of applications without redundancy. The electronic device may perform in advance an inference operation when an application is in a deactivated state, thereby preventing and/or reducing CPU processing unnecessarily residing in a RAM. The electronic device may minimize and/or reduce a storage space by sharing a machine learning model for a plurality of applications. If a common machine learning model is used in development of a new application, a development period may be shortened because there is no need to newly train and mount the machine learning model.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:

at least one processor comprising processing circuitry;

at least one sensor configured to sense sensing data, memory comprising a storage device storing instructions, that when executed by the at least one processor individually or collectively, cause the electronic device to:

map a target application to a machine learning model matched to a request of the target application among a plurality of machine learning models;

based on sensing data corresponding to the machine learning model being sensed by the at least one sensor and the target application being deactivated, generate an inference result by applying the mapped machine learning model to the sensing data before the target application is activated;

activate the target application based on the inference result; and transfer the generated inference result to the target application and another application mapped to the machine learning model.

2. The electronic device of claim 1, wherein the instructions, that when executed by the at least one processor individually or collectively, cause the electronic device to provide the generated inference result to the target application operating in one of a foreground process and a background process and the another application operating in one of the foreground process and the background process.

3. The electronic device of claim 1, the instructions, that when executed by the at least one processor individually or collectively, cause the electronic device to activate the deactivated target application based on at least one of an estimated label and an output value included in the inference result.

4. The electronic device of claim 1, the instructions, that when executed by the at least one processor individually or collectively, cause the electronic device to:

in response to an output value included in the inference result being out of a threshold range, activate the deactivated target application and transfer the inference result to the target application; and in response to the output value included in the inference result being within the threshold range, maintain a state of the deactivated target application.

5. The electronic device of claim 1, the instructions, that when executed by the at least one processor individually or collectively, cause the electronic device to, in response to an estimated label included in the inference result being matched to a reference label registered in the deactivated target application, activate the deactivated target application.

6. The electronic device of claim 1, the instructions, that when executed by the at least one processor individually or collectively, cause the electronic device to, each time another inference result is generated based on the target application being activated, provide the another inference result to the target application.

7. The electronic device of claim 1, the instructions, that when executed by the at least one processor individually or collectively, cause the electronic device to determine the machine learning model matched to the target application, based on at least one or a combination of two or more of a type of input data required in an inference operation of the target application, a format of the input data, an input source, a type of output data, a label list of the output data, and a format of the output data, among the plurality of machine learning models.

8. The electronic device of claim 1, wherein: the instructions, that when executed by the at least one processor individually or collectively, cause the electronic device to generate the inference result by implementing the machine learning model on the sensing data, using an accelerator, and the accelerator comprises a at least one or a combination of two or more of a central processing unit (CPU), a graphics processing unit (GPU), a digital signal processor (DSP), and a neural processing unit (NPU).

9. The electronic device of claim 1, wherein the plurality of machine learning models are stored in a memory space different from a memory space in which the target application is stored.

10. A method implemented by at least one processor, the method comprising:

mapping a target application to a machine learning model matched to a request of the target application among a plurality of machine learning models;

based on sensing data corresponding to the machine learning model being sensed by at least one sensor and the target application being deactivated, generating an inference result by applying the mapped machine learning model to the sensing data before the target application is activated;

activating the target application based on the inference result; and transferring the generated inference result to the target application and another application mapped to the machine learning model.

11. The method of claim 10, wherein the transferring of the generated inference result comprises providing the generated inference result to the target application operating in one of a foreground process and a background process and the another application operating in one of the foreground process and the background process.

12. The method of claim 10, wherein the activating of the target application comprises activating the deactivated target application based on at least one of an estimated label and an output value included in the inference result.

13. The method of claim 10, wherein the transferring of the generated inference result comprises:

in response to an output value included in the inference result being out of a threshold range, activating the deactivated target application and transferring the inference result to the target application; and in response to the output value included in the inference result being within the threshold range, maintaining a state of the deactivated target application.

14. The method of claim 10, wherein the transferring of the generated inference result comprises, in response to an estimated label included in the inference result being matched to a reference label registered in the deactivated target application, activating the deactivated target application.

15. The method of claim 10, wherein the transferring of the generated inference result comprises, each time another inference result is generated based on the target application being activated, providing the another inference result to the target application.

16. The method of claim 10, wherein the mapping of the target application to the machine learning model comprises determining the machine learning model matched to the target application, based on at least one or a combination of two or more of a type of input data required in an inference operation of the target application, aformat of the input data, an input source, a type of output data, a label list of the output data, and a format of the output data, among the plurality of machine learning models.

17. The method of claim 10, wherein: the generating of the inference result comprises generating the inference result by implementing the machine learning model on the sensing data, using an accelerator, and the accelerator comprises a at least one or a combination of two or more of a central processing unit (CPU), a graphics processing unit (GPU), a digital signal processor (DSP), and a neural processing unit (NPU).

18. A non-transitory computer-readable storage medium storing instructions that, when executed by a processor, cause the processor to perform the operations of claim 10.

* * * * *